Oct. 8, 1935.   G. A. LUTZ   2,016,380
METHOD OF WELDING
Original Filed May 4, 1933   3 Sheets-Sheet 1
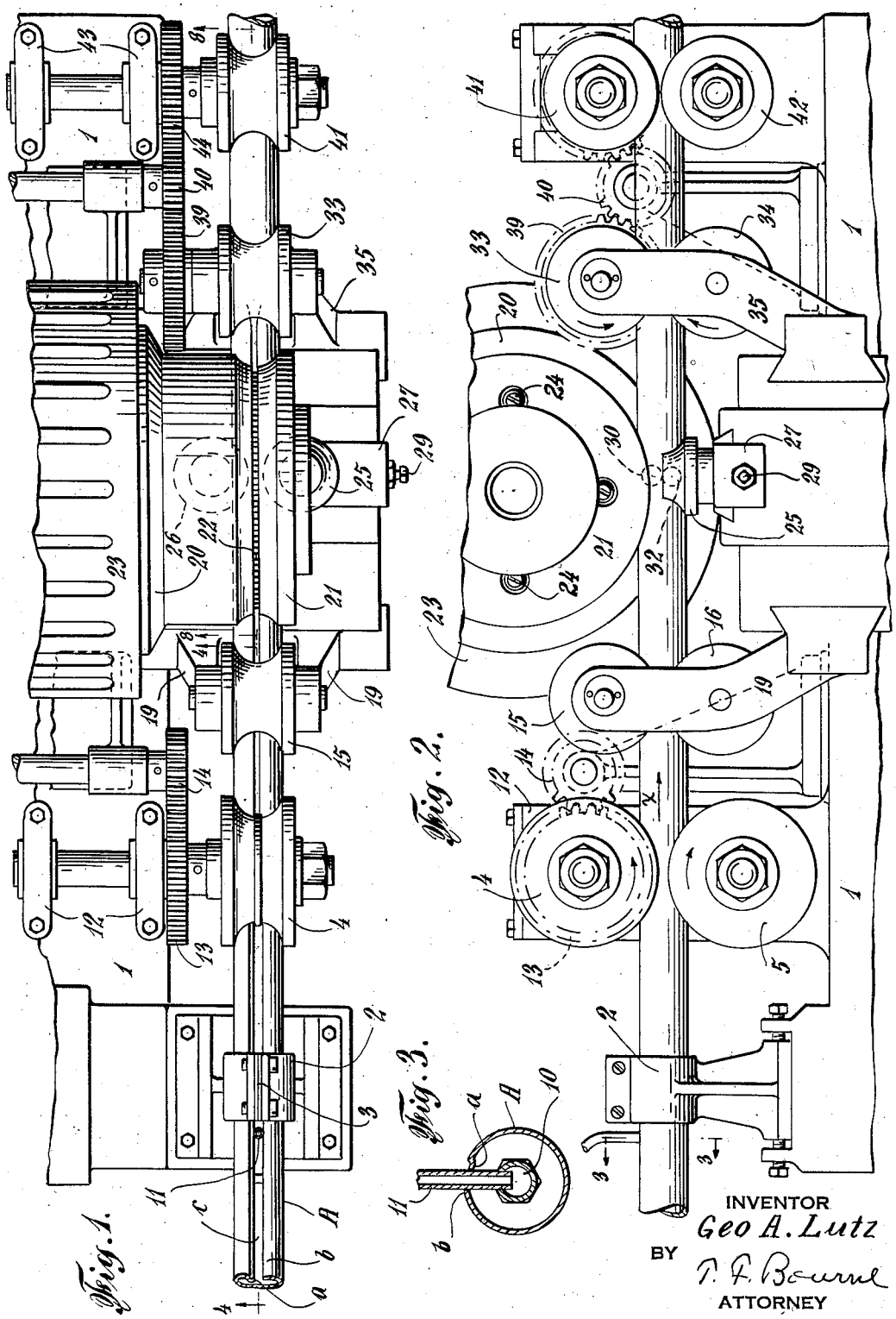
INVENTOR
Geo A. Lutz
BY
T. F. Bourne
ATTORNEY Oct. 8, 1935.    G. A. LUTZ    2,016,380
METHOD OF WELDING
Original Filed May 4, 1933    3 Sheets-Sheet 2
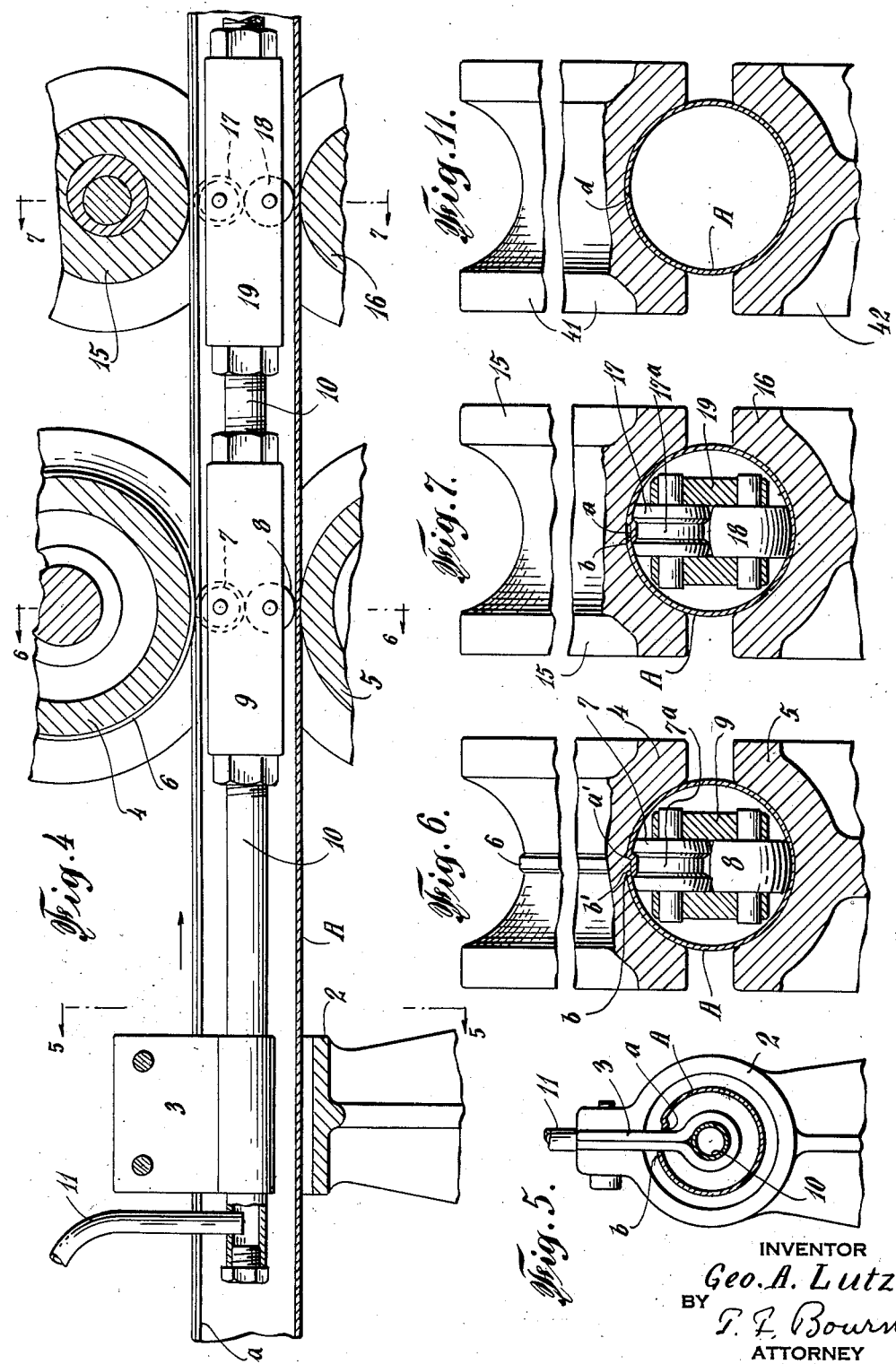
INVENTOR
Geo. A. Lutz
BY
T. F. Bourne
ATTORNEY

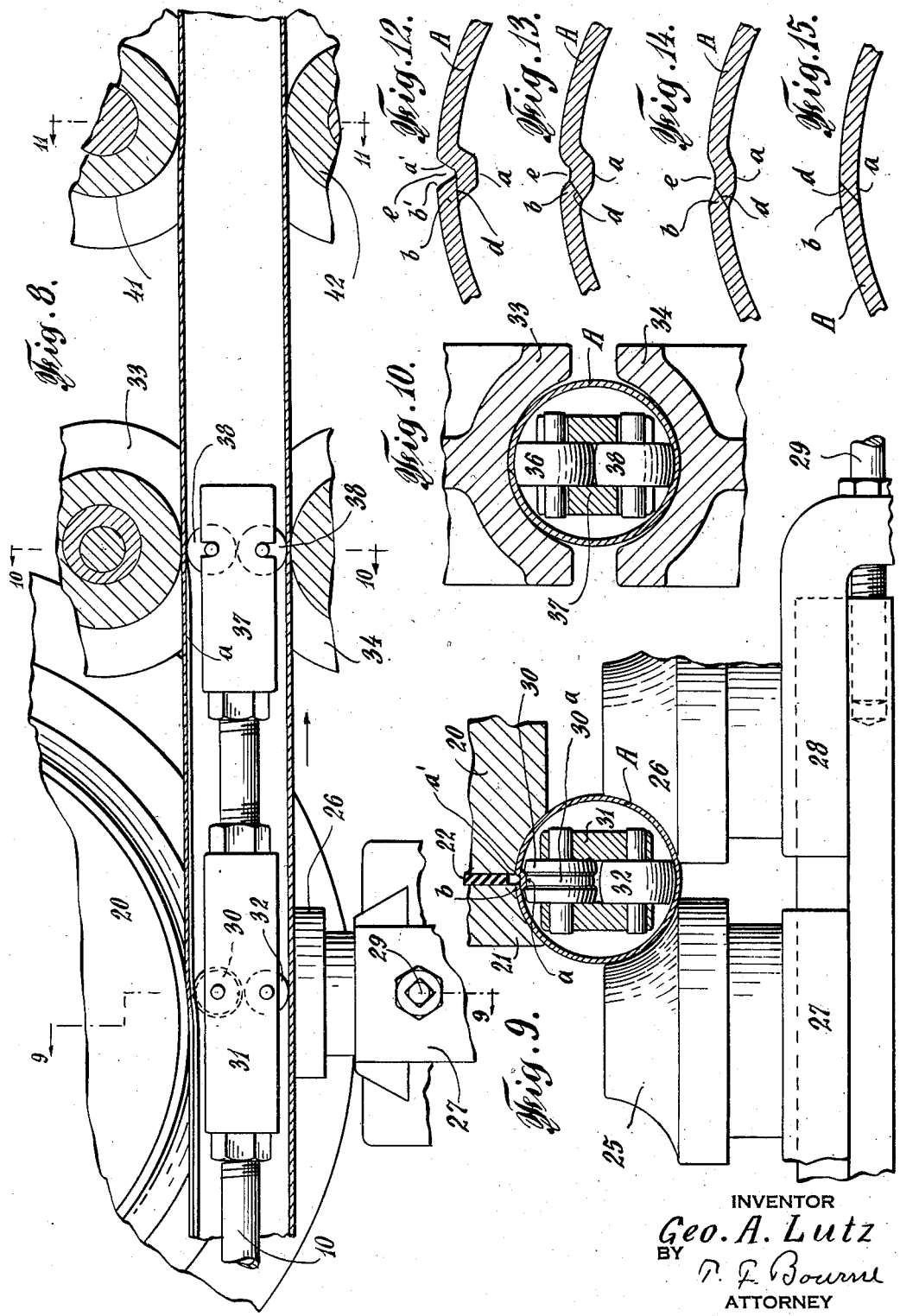

Patented Oct. 8, 1935

2,016,380

UNITED STATES PATENT OFFICE 2,016,380

METHOD OF WELDING

George A. Lutz, Cranford, N. J., assignor to American Circular Loom Company, Inc., New York, N. Y., a corporation of Delaware Application May 4, 1933, Serial No. 669,341
Renewed February 27, 1935

9 Claims. (Cl. 219—10)

My invention has reference to improvements in welding, and especially relates to the class called lap-welding, wherein two marginal portions of metal stock are lapped one upon another and welded together.

In accordance with my invention one marginal portion of metal stock or skelp is offset with respect to the adjacent metal thereof, as by bending or deflecting said portion, and another marginal portion of the stock to be welded is lapped on said offset portion, to a suitable distance; said lapped portions are then welded together, and the welded portions are pressed in such a way that the offset portion is pressed or forced outwardly or laterally between the adjacent main portions of the stock or skelp, in substantial register with the latter, causing said main portions to move in directions away from one another to admit the offset portion therebetween, whereby the welded parts and the main parts of the stock may be brought into a desired or substantially uniform relation, such as in circular form. My invention is particularly adapted to welding the marginal portions of tubular metal stock or skelp for the production of lap-welded tubes or pipes having their circumferences substantially uniform. When said marginal portions of tubular stock are lapped a space is left between the longitudinal edge of one portion and an inset part at the offset marginal portion, whereby the offset portion may be forced into said space so that the final tube wall at the welded portions may be substantially of the same thickness as the gage of the stock or skelp.

The accompanying drawings illustrate apparatus adapted for carrying out my invention, wherein Fig. 1 is a plan view of exemplary apparatus, showing the parts of the apparatus effective in conducting the herein described method; Fig. 2 is a side view of Fig. 1; Fig. 3 is a cross section on line 3, 3 in Fig. 2; Fig. 4 is an enlarged section on line 4, 4 in Fig. 1; Figs. 5, 6, and 7 are, respectively, cross sections on lines 5, 5, 6, 6, and 7, 7 in Fig. 4; Fig. 8 is an enlarged section on line 8, 8 in Fig. 1; Figs. 9, 10, and 11 are, respectively, cross sections on lines 9, 9, 10, 10, and 11, 11 in Fig. 8; Fig. 12 is an enlarged cross section illustrating the welded joint, and Figs. 13, 14, and 15 are similar sections illustrating successive steps in completing a welded tube.

Similar numerals indicate corresponding parts in the several views.

The frame 1 is provided with various pairs of rollers for the passage of a tubular metal blank or stock A. The blank A is provided with an offset portion $a$, extending along one marginal portion, upon which another marginal portion $b$ of the blank is to be lapped for welding said portions together. The offset portion $a$ may be made by suitably deflecting or bending the marginal portion of the blank, either before the blank is fed into the machine, or by suitable means provided in the machine, such as disclosed in Letters Patent to me No. 1,889,414, granted Nov. 29, 1932. In the example illustrated the metal blank A having the offset portion $a$ passes through a support 2 on the frame 1, which support has a guiding member 3 which extends through the open seam $c$ on the blank, serving to guide the latter as it travels. At a suitable distance from the support 2 is a pair of opposed peripherally-grooved rollers having a pass therebetween for the tubular blank A, the pass being of such dimension as to cause the seam $c$ to be closed and the marginal portion $b$ to be lapped on the offset marginal portion $a$ as the blank travels, such as illustrated in Fig. 6. The roller 4 is shown provided with a central annular rib 6 adapted to radially oppose the offset portion $a$ of the blank, as well as to oppose the inset portion $a'$ and the marginal edge $b'$ of the blank circumferentially, to cause proper alignment and registration of the lapped portions, with the edge $b'$ suitably spaced from the inset portion $a'$, (Figs. 6 and 12). Within the blank A is a roll 7 to bear against the latter in opposition to the roller 4, the roll 7 having a peripheral groove $7a$ receiving the offset portion $a$ of the blank, and serving to guide the blank in the desired position. The pass between the rollers 4, 5, the rib 6, and the groove $7a$ of roller 7 cooperate to maintain the inset portion $a'$ and the edge $b'$ of the blank in spaced relation as the blank travels. The roll 7 is shown engaged by a roll 8 within the blank to thrust against roller 5 with the blank interposed, whereby the desired pressure against the blank in various directions is afforded. The rolls 7 and 8 are pivotally carried by a suitable frame 9 connected with a tubular arm 10 within the blank, the arm being supported by the member 3. Through an inlet tube 11 the arm 10 may be supplied with water for cooling the parts within the blank, in a known way. The rollers 4 and 5 are carried by shafts journaled in supports 12 on frame 1, and said rollers may be operated by suitable gearing, at 13, 14, whereby said rollers may serve to propel the blank A through the machine, in the direction of the arrow $x$ in Fig. 2.

Spaced from the rollers 4, 5 are a pair of spaced rollers 15, 16 having peripheral grooves providing a pass to receive the blank A having the lapped marginal portions a, b. Within the blank A are opposing rolls 17, 18, pivotally carried by a frame 19 connected with arm 10. The roll 17 has a peripheral groove 17a receiving the offset portion a of the blank, thereby serving to guide the latter. The roller 15 and roll 17 serve to compress the overlapped blank portions a and b to a predetermined or definite thickness as the tubular blank traverses between said roller and roll, as in a manner set forth in Letters Patent to me No. 1,865,531, granted July 5, 1932. The rollers 15 and 16 are journaled on supports 19 on frame 1.

At a suitable distance from the rollers 15 and 16 are a pair of spaced electrodes 20 and 21, shown having grooved peripheries, to receive and bear on the blank A, respectively on opposite sides of the lapped portions a and b, (Fig. 9). The electrodes may be suitably spaced apart by insulation, such as at 22. The electrodes are rotative, and may be supplied with electric current in any desired way. As illustrated, the electrodes are carried by a rotary-type transformer, indicated at 23, of a well known variety, such as set forth in Letters Patent to me No. 1,594,891, granted August 3, 1926. The electrodes may be secured together and to the transformer in parallel relation, with their axes in common, as by insulated screws at 24, (Fig. 2). Any suitable guiding means for the blank A, at the electrodes, may be provided, such as rollers 25 and 26 pivotally carried by blocks 27 and 28, supported by frame 1, and adjustable by means of screws 29. The rollers 25, 26 are suitably grooved, whereby a pass or throat for blank A is provided between the electrodes and said rollers, in a known way. Within blank A is a roller 30 having a peripheral groove 30a to receive and guide the offset a of the blank, the portions of the roll at the sides of groove 30a preferably being of such diameter as not to engage the tube blank A. The roll 30 is pivotally carried by a frame 31, connected with arm 10 within the blank, and a roll 32 is pivotally carried by said frame to bear against the bottom portion of blank A, to resist thrust of electrode 21 through roll 30, (Fig. 9). The throat between the electrodes and the rollers 25, 26 and the groove in roll 30 receiving the offset a cooperate in maintaining the inset portion a' and the edge b' of the tubular blank in spaced relation during welding. By preference the vertical plane through the axis of roll 30 is at one side of a plane through the axes of the electrodes 21, 22 for a suitable distance, in the direction of travel of the blank A, and the top portion of roll 30 is slightly above the plane of the bottom surface of offset a of blank A, where it advances toward the electrodes, (Fig. 8), whereby an upward pressure of the blank against the electrodes is effected. By such means the lapped portions a and b are pressed together into contact for welding during the time the electric current is passing through said lapped portions between the electrodes, at which time the lapped portions adjacent to the electrodes are heated to a welding temperature by reason of the resistance between them to the flow of the current, and the offset portion a and the lapped portion b of the blank are welded. The weld between the portions a and b is effected at seam d, Fig. 12.

When the marginal portions a and b are lapped, as at the position shown in Fig. 6, the inner edge b' of the lapping portion b is set at a distance from the marginal inset portion of the blank at a', providing a space therebetween, at e, in radial register with the offset portion a, (Fig. 12), so that the said inner edge b' will not be welded to the inset portion a', and the offset portion a protrudes inwardly within the tubular blank. The inset portion a' and the edge b' are preferably inclined or beveled in such a way as to provide their surfaces at an oblique angle with the wide part of the space e extending outwardly. After the welding, (as in Fig. 12), I bend the metal of the blank adjacent to the welding by pressing the offset portion a, thereby widening the space e, and forcing the portion a into such space, whereby the seam at d is gradually turned from the substantially circular position of Fig. 12 into a position at an angle to a radius of the tube by succeeding stages until the final desired position of the metal is attained, such as diagrammatically illustrated by the several steps in Figs. 13, 14, and 15. The welded and adjacent parts of the blank then assume a substantially tubular form and the offset portion a, as such, disappears and becomes a portion of the tube wall. During such operations the metal adjacent to and at the sides of the weld d moves in opposite directions to accommodate the interposition of the offset metal a, (Fig. 15), which is facilitated by the oblique angular shape of the space e.

To bend the metal as aforesaid a pair of opposed spaced rollers 33, 34 are spaced from the electrodes, in the direction of travel of the welded tube, said rollers having grooved peripheries providing a pass for the tube, with the welded portion opposing the roller 33, (Figs. 8 and 10). The rollers are journaled on a support 35 carried by frame 1. Within the tube is a roll 36 to engage the tube at the welded portion along the offset a, which roll is carried by a frame 37 connected with the arm 10, and at 38 is a roll in engagement with the roll 36 and with the inner wall of the tube. The rolls 36, 38 take the thrust against the tube between the rollers 33 and 34. The rollers 33 and 34 may be operated by gearing at 39, 40, (Fig. 1). When the welded portion of the tube arrives at roller 33 and roll 36 the offset portion a is caused to be crowded and pressed therebetween, with the effect of simultaneously pressing said portion a outwardly into the space e between adjacent portions of the metal of the tube and causing displacement of the side walls of the tube, gradually deforming the welded seam portion and rounding it to substantially circular form, as in Fig. 15. The throat or pass between the rollers 33 and 34 is of a somewhat oval shape, so as not to hug or resist movement of the side walls of the tube and to cause spreading of the space e to admit the offset portion a due to the pressure at the weld between roller 33 and roll 36, whereby the tube may spread as required during the bending of the welded portions as the offset portion a is forced outwardly, (Fig. 10).

Spaced from the rollers 33, 34 is a pair of spaced peripherally grooved feeding rollers 41, 42, having a pass between them of circular form, the shafts of said rollers being journaled in supports 43 on frame 1. Gearing 44, 40 serves to rotate the rollers 41, 42 for feeding the welded tube. The circular shape of the pass between the rollers 41, 42 closely encircles and compresses the welded tube into circular form, with the seam d at an angle to a radius of the tube, (Fig. 11).

In accordance with my invention an offset marginal portion and another marginal portion of a tubular blank may be overlapped without engagement of the edge of the latter portion with the metal of the blank, leaving a space into which, after said portions have been welded, the offset portion may be forced to become a portion of the wall of the finished tube, whereby a corresponding amount of material is saved for a tube of given diameter.

Having now described my invention what I claim is:

1. The method of welding the marginal portions of a tubular metal blank together comprising lapping an offset marginal portion and another marginal portion of said blank together with the main parts of the blank in circular relation and providing a space therebetween in radial register with the offset portion, welding said lapped portions together with the seam between the lapping portions lying substantially in a circular direction around the longitudinal axis of the blank, and pressing the offset portion into said space with said seam extending at an angle to a radius of said tubular blank.

2. The method of welding the marginal portions of a tubular metal blank having an inset portion and an offset portion comprising traversing the blank, lapping the offset portion and another portion of the metal together with a space between the edge of the last named portion and the inset portion, maintaining said edge and said inset portion in spaced relation as the blank travels, welding said lapped portions together with said edge and said inset portion out of engagement, and pressing the welded portions into said space.

3. The method of welding the marginal portions of a tubular metal blank having an inset portion and an offset portion comprising traversing the blank, lapping the offset portion and another portion of the metal together with a space between the edge of the last named portion and the inset portion, maintaining said edge and inset portion in spaced relation as the blank travels, welding said lapped portions together with said edge and said inset out of engagement, pressing the welded portions into said space and displacing the side walls of the welded tube as the welded portion enters said space.

4. The method of welding the marginal portions of a tubular metal blank having an inset portion and an offset portion comprising traversing the blank, lapping the offset portion and another portion of the metal together with a space having surfaces at an oblique angle to one another between the edge of the last named portion and the inset portion, maintaining said edge and said inset portion in spaced relation as the blank travels, welding said lapped portions together with said edge and said inset out of engagement, and pressing the welded portions into said space.

5. The herein described method of joining metal marginally comprising welding to one marginal portion of metal another marginal portion offset and lapped therewith in the region of lapping, while leaving an interval between the opposed edges presented to each other by the offset lapping, and forcing metal of the offset marginal portion into the said interval to fill the same.

6. The herein described method of joining metal marginally comprising welding to one marginal portion of metal another marginal portion offset and lapped therewith in the region of the lapping, while leaving an interval between the opposed edges presented to each other by the offset lapping, exerting upon the welded region forces tending to increase the width of the said interval and forcing the metal of the offset marginal portion into the interval to fill the same.

7. The herein described method of joining the marginal portions of a tubular metal blank comprising welding to one marginal portion of said blank another marginal portion offset and lapped therewith in the region of the lapping, while leaving an interval between the opposed edges presented to each other by the offset lapping, and forcing the metal of the offset marginal portion into said interval to fill the same.

8. The herein described method of joining metal marginally comprising welding to one marginal portion of metal another marginal portion offset and lapped therewith in the region of lapping, while leaving an interval between the opposed edges presented to each other by the offset lapping, said edges so opposed being convergently inclined to said offset portion, and forcing the metal of the offset marginal portion into the said interval to fill the same.

9. The herein described method of joining the marginal portions of a tubular metal blank comprising welding in the region of their lapping one marginal portion of said blank and another marginal portion offset and lapped in its offset region with the first portion, while leaving an interval between the opposed edges presented to each other by the offset lapping, said edges so opposed being convergently inclined to said offset portion, and forcing the metal of the offset portion into said interval to fill the same.

GEORGE A. LUTZ.